May 19, 1925.

H. C. ODEN

MILKING MACHINE

Filed March 10, 1921

Henry Clyde Oden
INVENTOR.

BY
Edwin P. Corbett
ATTORNEY.

May 19, 1925.  
H. C. ODEN  
MILKING MACHINE  
Filed March 10, 1921  
1,538,735  
5 Sheets-Sheet 2

Henry Clyde Oden  Inventor

By E. P. Corbett  Attorney

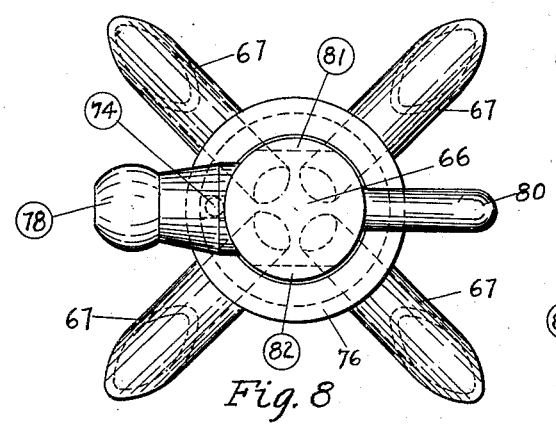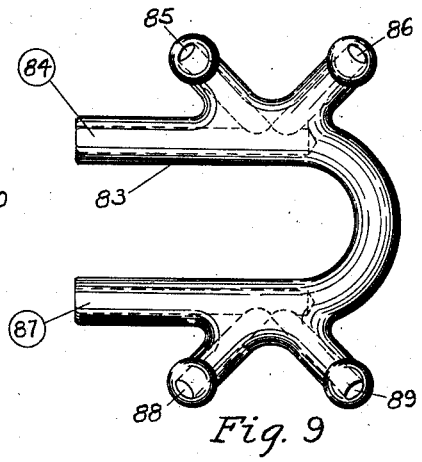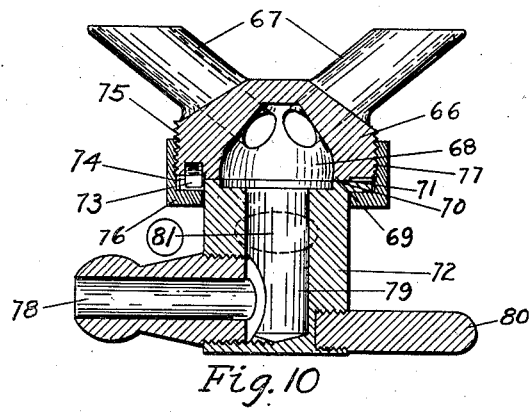

Patented May 19, 1925.

1,538,735

UNITED STATES PATENT OFFICE.

HENRY CLYDE ODEN, OF SYRACUSE, NEW YORK, ASSIGNOR, BY MESNE ASSIGNMENTS, TO PINE TREE MILKING MACHINE COMPANY.

MILKING MACHINE.

Application filed March 10, 1921. Serial No. 451,252.

*To all whom it may concern:*

Be it known that I, HENRY CLYDE ODEN, a citizen of the United States of America, residing at Syracuse, in the county of Onondaga and State of New York, have invented certain new and useful Improvements in Milking Machines, of which the following is a specification.

My invention relates to milking machines and aims to provide a milking machine whose essential parts are so constructed as to reduce the cost of manufacture to a minimum and to eliminate many difficulties hitherto attendant upon the practical application and operation of the various parts. It comprises a number of features which result in compactness and yet which lower the cost of manufacture and facilitate the various operations which are necessary to place and maintain a milking machine in practical use from day to day.

A still further feature of my invention has to do with the provision of a novel form of milk and air claw which is very readily cleaned, which has a greatly increased flexibility that ensures the dropping of the teat cups to such an angle as to facilitate the shutting off of the vacuum being applied through the rubber tubes to the inner chambers of the teat cups thereby facilitating the application of the teat cups to the cow's teats. Furthermore, my milk and air claw construction is such that these two claws will be held together due to their own inherent constructions without the necessity of any supplemental means either in the form of an independent element or of complemental parts of the milking machine.

The pulsator and appurtenant mechanism herein shown and described is included to facilitate an understanding of the construction and operation of the claw which constitutes and is claimed as the principal feature of this application. This pulsator is claimed in a divisional application, Serial Number 736,365, filed September 6, 1924.

Other features of advantage will appear as this description progresses.

The preferred embodiment of this invention is shown in the accompanying drawings wherein similar characters of reference designate corresponding parts and wherein:

Figure 8 is a bottom plan view of my novel form of milk claw.

Figure 9 is a top plan view of my novel form of air claw which is separable from the milk claw but capable of application thereto in a manner to ensure a highly important flexibility of the combined structure.

Figure 10 is a vertical section taken through the structure shown in Figure 8.

Figure 11 is a side elevation of the air claw shown in Figure 9.

Figure 12 is an assembled view of a claw cluster construction with milk and air tubes attached.

Figure 6:
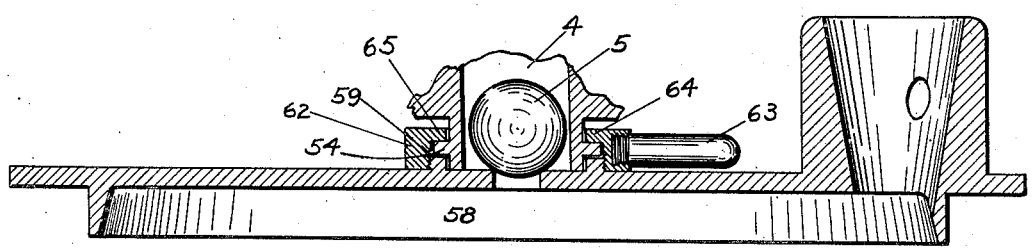
Figure 6 is a transverse section of my pail cover and showing the locking collar clamping the chamber element of the pulsator member in air-tight relation to the cover.

In the drawings, the pulsator is shown as comprising a pulsator block 1 with a main vacuum passage 2 extending through a nipple 3 and leading into a main vacuum chamber 4 which is designed to house a ball check valve 5, as in Figure 6. Leading off from the chamber 4 is a branch vacuum passage 6 that is alternately placed in connection with passages 7 and 8 which respectively lead to conduits 9 and 10 communicating with the pulsating chambers of teat cups not shown. This alternate connection of the passages 7 and 8 with the passage 6 is effected by a circular slide valve 11 that is so mounted and so connected to an impelling means that in the event of any dirt or extraneous material creeping in between the valve and its seat, this valve will be capable of sufficient rotation during the course of its movement to expel this dirt or extraneous material by a centrifugal action.

Leading from the main vacuum passage 2 there is also provided a branch vacuum conduit 12 which is under the control of a needle valve 13 threaded as at 14 and having a knurled head 15. In between the knurled head and the pulsator block is a washer 16 against which bears a coil spring 17 that bears at its opposite end against the knurled head 15. This spring effects a locking action upon the needle valve so that it will remain in any position to which it is adjusted.

The conduit 12 is alternately connected with passages 18 and 19 by means of a valve 20 which is mounted upon and designed to swing about a post 21. These passages 18 and 19 respectively lead to the opposite end of the pulsator cylinders by hollow screws and the housings therefor which will be subsequently described.

The cylinders of the pulsator are of an extremely simple construction because they are each made from a single piece of material. In the drawings, they are designated 22 and 23. Each cylinder is held to the pulsator block on one side by a threaded bolt 24 and on the other side by a hollow screw 25. The threaded bolts 24 pass through integral flanges 26. Operating within each cylinder is a piston head 27 and these piston heads are connected together by a lock rod 28.

The extremely simple construction described is made possible by the provision of the hollow screws 25 which are threaded at 29 and provided with passages 30 and 31 that communicate with the passages 18 and 19. The threads 29 of the hollow screw are designed to screw into the internally threaded sockets 32 of the pulsator block and since these sockets 32 are intercepted by the passages 18 and 19, the hollow screws serve to assist in holding the cylinders 22 and 23 in position and to provide a means of communication of the passages 18 and 19 to the cylinder interior. This communication is rendered complete by the fact that the bores through which the hollow screws extend are of a larger diameter than the shanks of the screws and communicate adjacent their outermost ends with the cylinder interiors by means of passages 33. It will be apparent that the vacuum thus becomes effective upon the pulsator pistons by way of the passages 18 or 19, passages through the screws which are designated 30 and 31, the bores which may be designated 34 and the ports 33 leading into each cylinder adjacent its end.

The oscillating valve 20 is provided with an upstanding pin 35 upon its upper surface and this upstanding pin fits very loosely into an aperture 36 in a trip arm 37 that is likewise mounted upon the post 21. These members 21 and 37 are held in position upon this post 21 by means of a washer 38 and a nut 39. The trip arm 37 extends rearwardly beyond the post and carries an upstanding pin 40 having an annular groove adjacent its upper end for the reception of one end of a coil spring 41. The forward end of the trip arm overlaps a bearing plate on the lock rod, this bearing plate desirably forming a part of such lock rod and being designated 42. At this point it may be well to state that the coil spring 41, in addition to its regular function, has a tendency to lift the rear end of the trip arm and thus prevent binding of this arm upon the oscillating valve 20. In conjunction with this, the bearing plate 42 supports the forward end of the trip arm and ensures that this forward end will exert no downward pressure upon the oscillating valve 20. The combined result of this construction is that the oscillating valve is rendered absolutely free of any pressure either downward or upward and the vacuum is freely effective to hold the valve in even position upon its seat.

Figure 1:
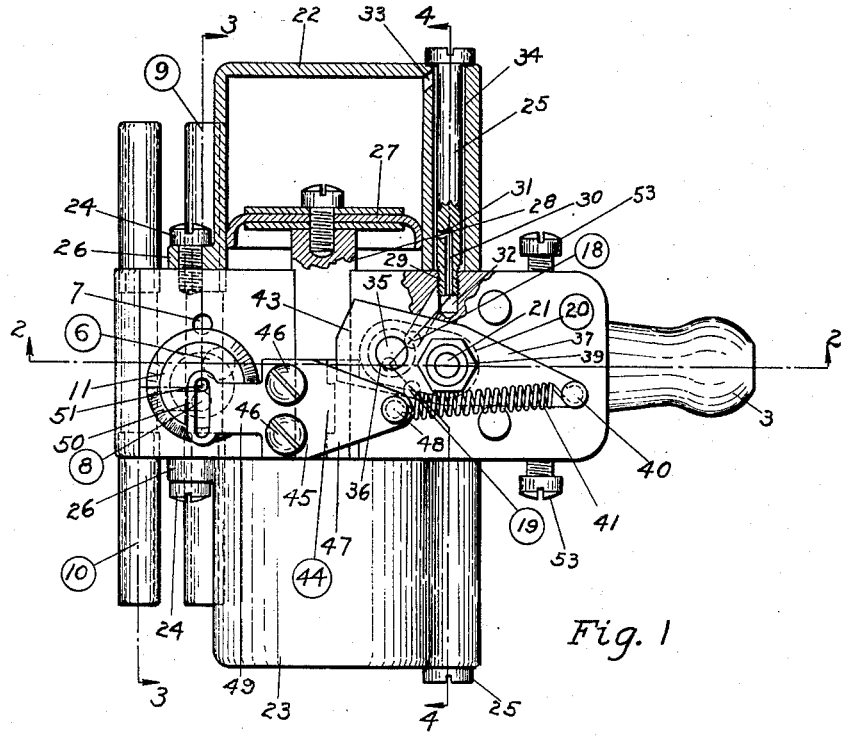
Figure 1 is a plan view, partially in section, of what I have termed my pulsator element, with the cover removed.
Figure 2:
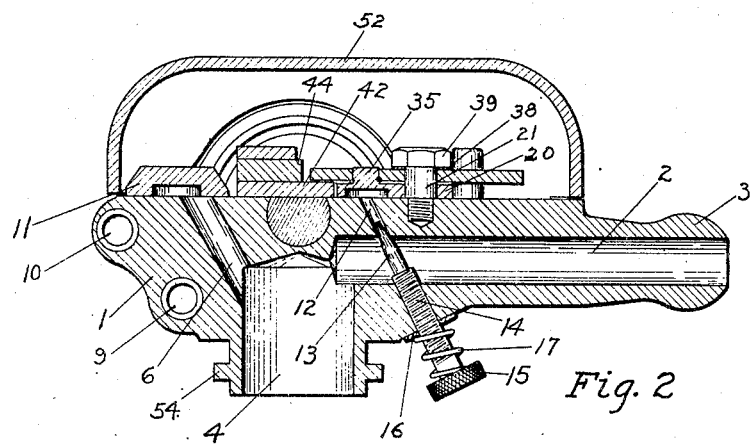
Figure 2 is a section taken on line 2—2 of Figure 1, with the exception that it shows the cover plate in position.
Figure 3:
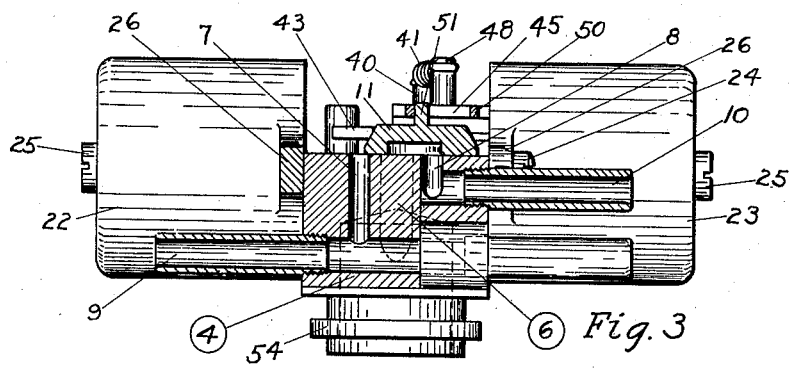
Figure 3 is a section taken on line 3—3 of Figure 1.
Figure 4:
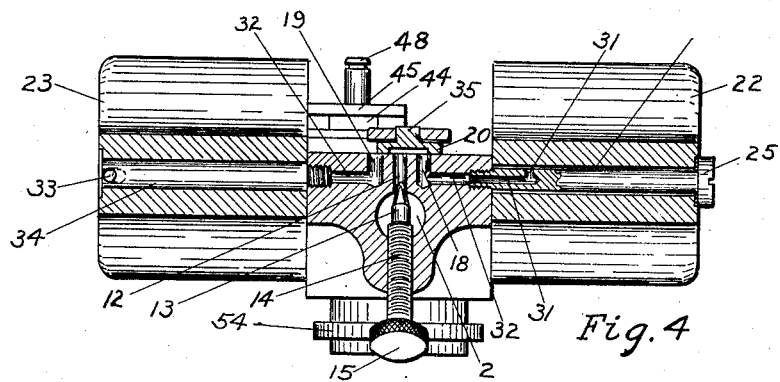
Figure 4 is a section taken on line 4—4 of Figure 1.

The forward end of the trip arm is of angular form as shown at 43 in Figure 1 and this angular end cooperates with the locking piece 44. Mounted upon the locking piece is a pulsation valve arm 45 held in place by screws 46 and having a rear extension 47 carrying a pin 48. This pin 48 has an annular groove adjacent its upper end in which fits the forward end of the spring 41. In operation, the movement of the piston element and the locking rod into a new position will cause a gradual tensioning of the spring 41 but the trip arm will be held in the same position by means of the lock 44 until the spring passes center. Immediately after this spring passes center, the trip arm snaps over into its new position.

The forward end of the pulsation valve arm has a shank 49 and a slotted head 50. Into the slot of this head 50 extends an upstanding pin 51 centrally mounted on the valve 11. The obvious result is that as the piston moves away from the position it is in toward its opposite position it brings about both an oscillation of the valve 20 and a sliding movement of the valve 11 for the purpose of connecting the various passages in the manner already indicated. It will be noted that the slot in the head 50 permits of a certain amount of lost motion and it also facilitates the rotation of the valve 11 whenever this becomes necessary.

The pulsator member is desirably provided with a cover plate 52 that fits over and protects the valve structure from dirt or extraneous material of any kind. The forward end of this cover plate is provided with bifurcate lugs (not shown) which fit over and are clamped in place by screw bolts 53.

Figure 5:
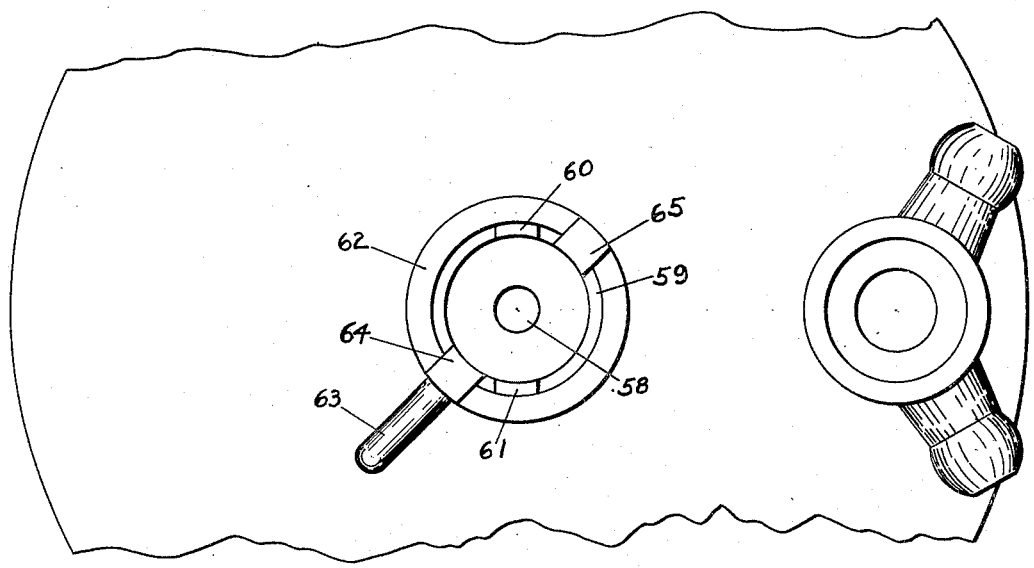
Figure 5 is a plan view of my pail cover showing the locking collar mounted thereon and the pulsator element removed.
Figure 7:
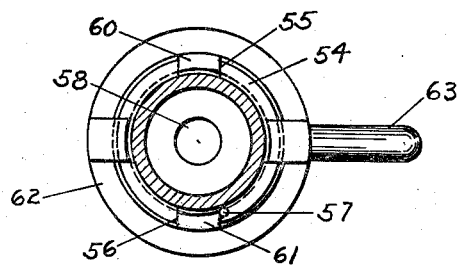
Figure 7 is a bottom plan view showing the chamber element of the pulsator member together with the locking flanges and the stop pin carried thereby.
Figure 15:
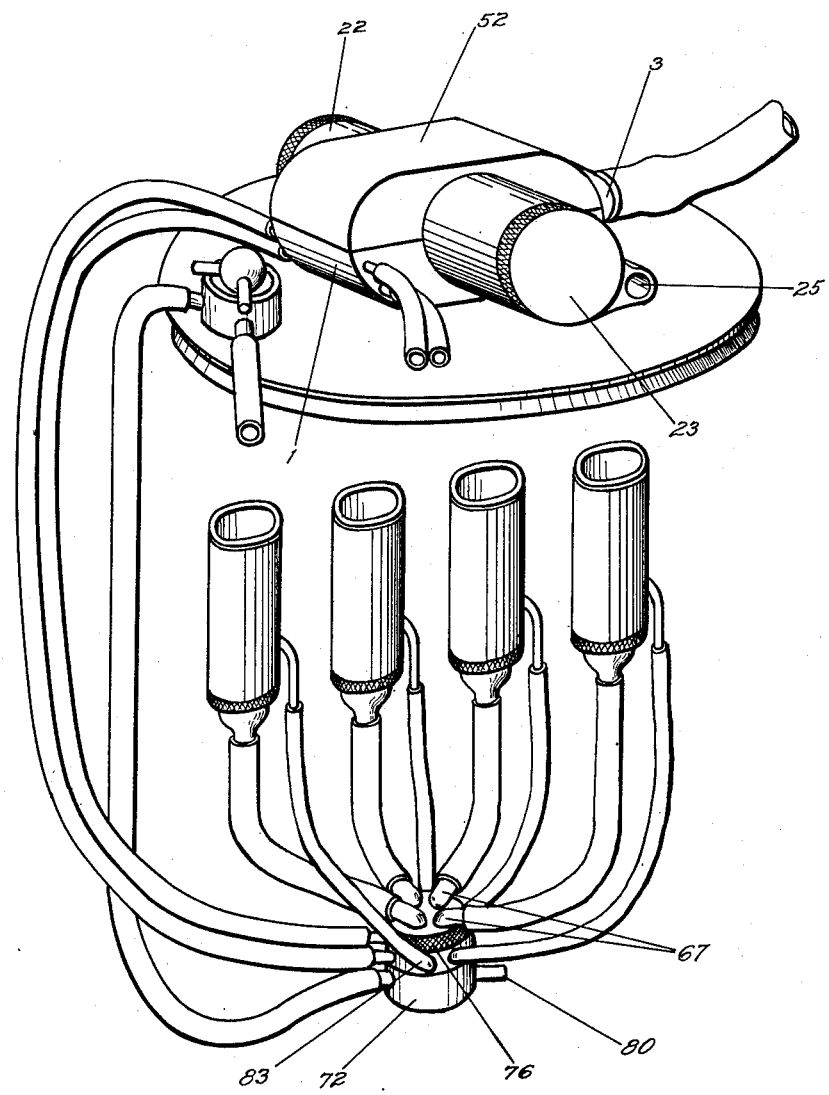
Figure 15 is a perspective view in conventional form showing the parts in assembled relation and connected to respective teat cups.

The manner of attaching the pulsator to the pail cover is shown best in Figures 5, 6 and 7 and consists in providing the lower end of the chamber 4 with an exterior flange 54 that is cut away as at 55 and 56. There is also mounted in this flange a vertical stop pin 57. Extending upwardly from the pail cover and in concentric relation to the aperture 58 therein is an externally threaded wall 59 of circular form and carrying upstanding shoulders 60 and 61 which are designed to fit into the cutaway portions 55 and 56 of the flange member 54. There is also provided a collar 62 having a handle 63 extending radially therefrom and provided with internal screw threads for coaction with the screw threads 59. This collar is also provided with inwardly projecting lugs 64 and 65 which are designed to pass through the cutaway portions 55 and 56 so that upon rotation of the collar the pulsator member will be locked to the pail cover. In operation, the ring is placed in position and partially screwed down upon the threads of the wall 59 and then the inwardly extending lugs 64 and 65 are caused to register with the lugs 60 and 61 upon this upstanding wall 59. Then the pulsator element is placed in position so that the lugs 60 and 61 and the lugs 64 and 65 will pass upwardly through the cutaway portions 55 and 56 of the flange 54. As soon as this is effected, a rotation of the collar 62 will simultaneously lock the pulsator to the lid and draw the lower end of the chamber 4 into air-tight relation with the valve seat. The pin 57 provides a stop for determining the proper position of the collar when the pulsator is to be applied to the pail lid and after the pulsator is applied, this pin ensures that the rotation of the collar will be in the proper direction to bring about a locking of the pulsator into air-tight relation to the pail lid.

I have provided a novel form of claw construction which is shown in Figures 8 to 14 inclusive. In this construction, the milk claw and the air claw are independent elements which, however, have an interfitting and interlocking relation to each other. In addition, the milk claw is separable into two parts in a manner that will greatly facilitate cleansing thereof.

The milk claw is shown best in Figures 8 and 10 and it comprises a top member 66 having branch conduits 67 which diverge from a conical chamber 68. The lower edge of the wall of this conical chamber is provided with a narrow circular extension 69 forming a narrow seat for coaction with a seat 70 that is somewhat wider. This seat 70 is formed by a flange 71 upon the lower portion 72 of the milk claw and this flange 71 is cut away as at 73 for coaction with a pin 74 extending downwardly from the member 66 adjacent the seat 69. The member 66 is externally threaded as at 75 and a flanged ring 76 is internally threaded as at 77 and designed to fit up over the flange 71 and by rotation into the thread 75 to force the seats 69 and 70 into air-tight relation. The pin 74 in the cutaway place 73 precludes relative rotation of the seats 69 and 70 and screwing down of the flange ring 76 serves to firmly lock these parts together. The flanged ring 76 is desirably knurled on its exterior.

The member 72 is provided with a main vacuum conduit 78 leading into a central chamber 79 and diametrically opposite thereto on the member 72 is a laterally extending pin 80. It will be apparent that the conduit 78 and the pin 80 are in substantial alignment and extend from opposite sides of the member 72. The other two sides of the member 72 are grooved as at 81 and 82, it being apparent that the conduit 78 and the pin 80 are spaced from the lower side of the flanged ring 76.

The air claw is shown best in Figures 9 and 11 and is in the form of a U-shaped member 83 having in one leg a duct 84 leading to branch conduits 85 and 86 and having in the other leg a duct 87 leading to branch conduits 88 and 89. This member 86 is designed to straddle the shank of the member 72 and to fit with comparative looseness into the grooves 81 and 82. This relation is such that the air claw cannot be removed from the milk claw by a tilting action although the air claw is capable of a slight tilting action upon the milk claw in any direction. Removal must be effected by a sliding of the air claw with relation to the milk claw.

Figures 13, 14:
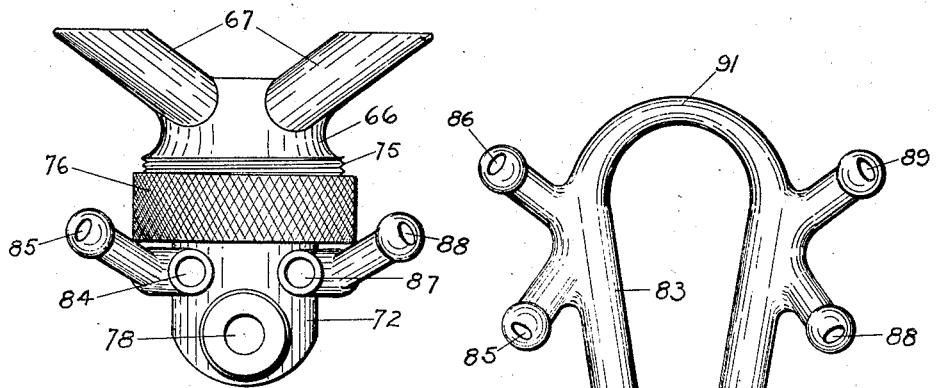
Figure 13 is a plan view of a modified form of an air claw.
Figure 14 is an assembled view of a milk claw and the modified air claw shown in Figure 13.

In Figures 13 and 14, the legs of the air claw are slightly bent in toward each other and are sufficiently resilient so that, when once placed in position, one upon the other, they cannot be freely removed even by a sliding action and with all of the rubber tubes removed. Sufficient force must be exerted to overcome the retaining effect of the resilient portion 91. However, it will be understood that even in this modified form, the air claw and milk claw are slightly tiltable in any direction with relation to each other.

This relative independence and relative flexibility between the air claw and the milk claw greatly facilitates the handling of the milking machine and particularly the application of the teat cups to the cow's teats, because it is possible to arrange or to rearrange the air tubes leading to the pulsating chambers of the teat cups in such a manner that the vacuum will be temporarily shut off when these teat cups assume gravity position as the operator picks up the claw cluster and also as he successively applies the teat cups to the cow's teats.

It is important to note that in the structure of milking machine described herein, the removal of the pulsator from the lid is effected by the simplest possible operation and that the operation of removing the pulsator from the lid immediately exposes the check valve and the interior of its housing for the purpose of cleansing, this exposure of the check valve and the housing parts being brought about absolutely without the necessity for any other operation than the mere removal of the pulsator from the pail lid.

Another important feature of my invention has to do with the provision of abutting seats of different area in the separable milk claw construction. I have found this a highly desirable feature and one that very greatly facilitates the provision of an air-tight construction.

Having thus described my invention, what I claim is:

1. In a milking machine, a claw structure comprising a milk claw, and an air claw said milk and air claws being designed to interlock but to be capable of slight relative movement while so interlocked.

2. In a milking machine, a claw structure comprising a milk claw and an air claw, said claws being designed to interlock in such a manner that they will be capable of a slight relative tilting action.

3. In a milking machine, a claw construction comprising a milk claw and an air claw, said claws being so constructed that they will have an interlocking action and yet be capable of a slight relative tilting in any direction.

4. In a milking machine, a claw structure comprising a milk claw and an air claw, said claws being slidable into interlocking relation.

5. In a milking machine, a milk claw formed in two parts, one part carrying the main conduit and the other part carrying the branch conduit, said parts being separable.

6. In a milking machine, a milk claw comprising one section having branch conduits thereon, another section having the main conduit thereon, and a screw ring for connecting said sections and drawing them into air-tight relation.

7. In a milking machine, a milk claw comprising one section carrying the branch conduits, another section carrying the main conduit, a screw ring for drawing said sections into air-tight relation, and a means for preventing rotation of said sections with relation to each other during the rotation of said ring to bring these sections into air-tight relation.

8. In a milking machine, a milk claw formed in two sections, one seated on the other, the seat of one section being of lesser area than the seat of the other section.

9. In a milking machine, a milk claw formed in two sections and one seated on the other, the seat of one section being more narrow than the seat of the other section with which it contacts, and means for drawing these seats into air-tight relation.

10. In a milking machine, a milk claw comprising an upper and lower section, one of these sections carrying branch conduits, the section which carries the branch conduits having a substantially semi-spherical interior with its widest portion uppermost and the conduits leading off from various parts of said sphere at points adjacent its widest portion.

11. In a milking machine, a milk claw comprising a lower section carrying a main conduit, an upper section carrying the branch conduits, said sections being separable at such a point that the upper section presents a shallow basin with the branch conduits leading therefrom and readily accessible for cleansing.

12. In a milking machine, a claw construction comprising an air claw of bifurcate form, a milk claw, branch conduits extending from the upper end of said milk claw, a main conduit extending from the lower end of said milk claw, a shank between said branch and said main conduit of sufficient length to permit the legs of said bifurcate air claw to slide into interlocking relation to said milk claw by straddling said shank.

13. In a milking machine, a claw construction comprising an air claw of bifurcate form, a milk claw, branch conduits extending from the upper end of said milk claw, a main conduit extending from the lower end of said milk claw, a shank between said branch and said main conduit of sufficient length to permit the legs of said bifurcate air claw to slide into interlocking relation to said milk claw by straddling said shank and grooves in said shank into which the legs of said air claw loosely fit.

14. In a milking machine, a claw construction comprising a milk claw and an air claw, said claws being separable only by sliding action.

15. In a milking machine, a claw construction comprising a milk claw and an air claw, said claws being separable but being held in interlocking relation by a resilient construction of one of said claws.

16. In a milking machine, a claw construction comprising a milk claw, a shank forming a part of said claw, and a bifurcate air claw, the legs of said bifurcate air claw being resilient and so formed that the resiliency of the said legs will preclude separation of said claws without the application of sufficient pressure to overcome said resiliency.

17. In a milking machine, a milk claw, a shank on said claw, a main vacuum conduit leading laterally into the upper end of said shank, a pin extending laterally from the upper end of said shank at a point substantially opposite said main vacuum conduit, a U-shaped air claw for straddling said shank, a tube leading from said main conduit, a Y tube construction leading from the legs of said U-shaped claw, the base of said U-shaped claw cooperating with said pin and the said Y tube construction cooperating with the main vacuum tube to preclude complete separation of the said milk and air claws.

18. In a milking machine, a claw construction comprising an air claw of bifurcate form, said claw having separate conduits whereby a vacuum and atmospheric air may be simultaneously conducted to the teat cups.

In testimony whereof I hereby affix my signature.

HENRY CLYDE ODEN.